United States Patent [19]

Manako et al.

[11] Patent Number: 5,838,468
[45] Date of Patent: Nov. 17, 1998

[54] METHOD AND SYSTEM FOR FORMING FINE PATTERNS USING HOLOGRAM

[75] Inventors: Shoko Manako; Jun-ichi Fujita; Yukinori Ochiai; Shinji Matsui, all of Tokyo, Japan

[73] Assignee: NEC Corporation, Tokyo, Japan

[21] Appl. No.: 631,237

[22] Filed: Apr. 12, 1996

[51] Int. Cl.$^6$ ............................. G02B 5/32; G02B 27/24; G03H 1/00

[52] U.S. Cl. ................................ 359/15; 359/565; 359/1; 378/34; 378/35

[58] Field of Search .............................. 359/15, 563, 565, 359/566, 902; 378/34, 35, 36; 250/251

[56] References Cited

U.S. PATENT DOCUMENTS

| | | | |
|---|---|---|---|
| 4,945,551 | 7/1990 | Makabe et al. | 378/34 |
| 4,947,413 | 8/1990 | Jewell et al. | 378/34 |
| 5,455,850 | 10/1995 | Howells et al | 378/34 |
| 5,543,228 | 8/1996 | Taniguchi et al. | 430/1 |

FOREIGN PATENT DOCUMENTS

| | | |
|---|---|---|
| 57-22277 | 2/1982 | Japan . |
| 61-6782 | 1/1986 | Japan . |
| 62-19786 | 1/1987 | Japan . |
| 3284786 | 12/1991 | Japan . |
| 4267132 | 9/1992 | Japan . |
| 5323859 | 12/1993 | Japan . |

OTHER PUBLICATIONS

Dandliker et al., Non–Conventional Techniques for Optical Lithography, 1995, pp. 205–211.

Pfeiffer et al., An E–Beam Stepper with Variable Axis Immersion Lenses, 1995, pp. 143–146.

Ogai et al.,"Nanofabrication of grating and dot patterns by electron holographic lithography", Jan. 24, 1995, pp. 1560–1562.

Ogai et al.,"An Approach for Nanolithography Using Electron Holography",Sep. 18, 1993, pp. 5988–5992.

Hattori et al., Electron–beam direct writing system Ex–8D employing character projection exposure method, Jul. 19,1993, pp. 2346–2351.

Sakitani,"Electron–beam cell–projection lithography system", Jul.16, 1992, pp. 2759–2763.

Elsner et al.,"Multiple beam–shaping diaphragm for effecient exposure of gratings", Jul. 14, 1993, pp. 2373–2377.

Chang et al.,"Arrayed miniature electron beam columns for high throughout sub–100 nm lithography", Aug. 5, 1992, pp. 2743–2748.

Yasuda et al.,"Electron Beam Block Exposure", Sep. 21, 1991, pp. 3098–3102.

Berger et al., "New Approach to projection–electron lithography with demonstrated 0.1 um linewidth", May 4, 1990, pp. 153–155.

Lischke et al.,"Multi–Beam Concepts for Nanometer Devices", Aug. 19, 1989, pp 2058–2064.

Jones et al.,"Microstructures for particle beam control", Aug. 24, 1988, pp. 2023–2027.

*Primary Examiner*—Jon W. Henry
*Assistant Examiner*—Audrey Chang

[57] ABSTRACT

The method for forming a fine pattern on a substrate disclosed includes a step of preparing a hologram having a pattern, a step of irradiating material waves (de Broglie waves) such as neutral beams, ion beams and electron beams on the hologram, and a step of imaging the pattern on the substrate with the material waves being interfered by passing through the hologram. The light source has a source that emits a beam having a coherent wave front. Since the fine patterns are formed by utilizing the interference of material waves, the minimum processing precision can be enhanced to the extent of the wavelength of the material wave.

5 Claims, 7 Drawing Sheets

METHOD AND SYSTEM FOR FORMING FINE PATTERNS USING HOLOGRAM

BACKGROUND OF THE INVENTION

(1) Field of the Invention

The present invention relates to a method for forming patterns, a material wave writing system, and a method for producing a surface relief structure, and more particularly to a method for forming fine patterns by lithography using a material wave such as an electron beam (E-beam) and an atomic beam, a material wave writing system, and a method for producing a fine surface relief structure.

(2) Description of the Related Art

Conventionally, for the pattern formation in fabricating semiconductor devices such as Large Scale Integrated (LSI) circuits, a lithographic method wherein beams of light are irradiated on a photosensitive material followed by a developing process is widely employed. Recently, however, since there is a limit in the processing precision in the lithography process depending on the wavelengths of the light irradiated in the lithography process, it is common to use lithography methods using an electron beam, an ion beam and an X-ray which have shorter wavelengths. Also, in the production of a fine surface relief structure, there have been reported methods wherein a pattern formation process employs a gas which is excited by irradiation of, for example, an electron beam, ion beam and laser beam and is decomposed thereby causing the deposition reaction to occur.

On the other hand, it is known that a hologram has been produced using light waves, electron beams, etc. (as disclosed, for example, in Japanese Patent Application Kokai Publication Nos. Sho 57-22277 and Hei 3-284786). Particularly, the hologram made by light waves and reproduced by white light is in everyday use, for example, in a timepiece dial plate (Japanese Patent Application Kokai Publication No. Sho 62-19786) and in magazine covers for ornamental effects or in magnetic cards for security purposes (Japanese Patent Application Kokai Publication No. Sho 61-6782).

Also, for forming a surface relief structure using the hologram, a method in which an organic polymer film is used is well known. For example, by irradiating the laser bean on the hologram recorded in a liquid-crystal spatial optical modulator of an electric field control birefringent mode, the laser beam having been phase-modulated is irradiated on a non-hardened resin, and is hardened as a cross sectional image of three dimension (Japanese Patent Application Kokai Publication No. Hei 4-267132).

In the fabrication of a semiconductor device, the pattern formation technique is one of the main techniques which is determinant of the device characteristics. In the recent developments of the ULSI (Ultra Large Scale Integration) circuits, it is a very important object to attain ultra miniaturization and high throughput.

SUMMARY OF THE INVENTION

An object of the present invention, therefore, is to overcome the problems existing in the prior art, and to provide a method for forming fine patterns, a material wave writing system, and a method for producing a surface relief structure using a holography technique with shorter wavelength material waves.

A further object of the present invention is to provide a method for producing a surface relief structure, which permits freedom in pattern formation and simplifies the processes involved.

According to one aspect of the present invention, there is provided a method for forming a fine pattern on a substrate, comprising the steps of:

preparing a hologram having a pattern;

irradiating material waves on the hologram; and imaging the pattern on the substrate with the material waves being interfered by passing through the hologram.

In the above method, for forming the hologram, a periodic minimum unit pattern of desired periodic structure patterns may be converted and recorded in the hologram, and for imaging the material waves, a high order diffraction image obtained by irradiating the material waves on the hologram may be included in the imaging on the substrate.

According to another aspect of the present invention, there is also provided a method for forming a fine surface relief structure, comprising the steps of:

preparing a binary hologram generated by a computer based on a hologram data of a surface relief structure;

irradiating material waves on the binary hologram; and forming a material wave reconstructed image at a substrate position with the image corresponding to irradiation intensities and focal points of the surface relief structure.

The present invention is based on the finding by the inventors that the pattern formation method by material wave lithography employing a hologram and utilizing charged particle corpuscular beams or neutral beams such as electron beams and ion beams (that is, material waves or de Broglie waves) is a method that can be used effectively in overcoming the above explained problems.

According to the present invention, material waves are irradiated on the hologram, and the material waves passing through the hologram and having been interfered are imaged or reconstructed on the wafer so that a fine pattern can be formed on the wafer. Since the wavelength of the material wave is short, a finer pattern can be formed on the wafer as compared with that obtained by the conventional lithography technique using light beams.

Also, it is possible to effectively utilize the properties of the hologram, the properties being such that the reconstructed image is not affected by the impurities existing on the hologram or the defects in the hologram itself.

Also, according to the invention, since a higher order image reconstructed in cycle with respect to a first order reconstruction image is utilized as the reconstruction image obtained by the hologram, it is only necessary to form a periodic minimum unit pattern.

Furthermore, by utilizing the Computer Generated Hologram (CGH), it is possible to form a hologram for an imaginary surface relief structure and to obtain a reconstruction image by the material waves. This enables the formation of a three dimensional pattern of a nanometer order without using a resist.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1:
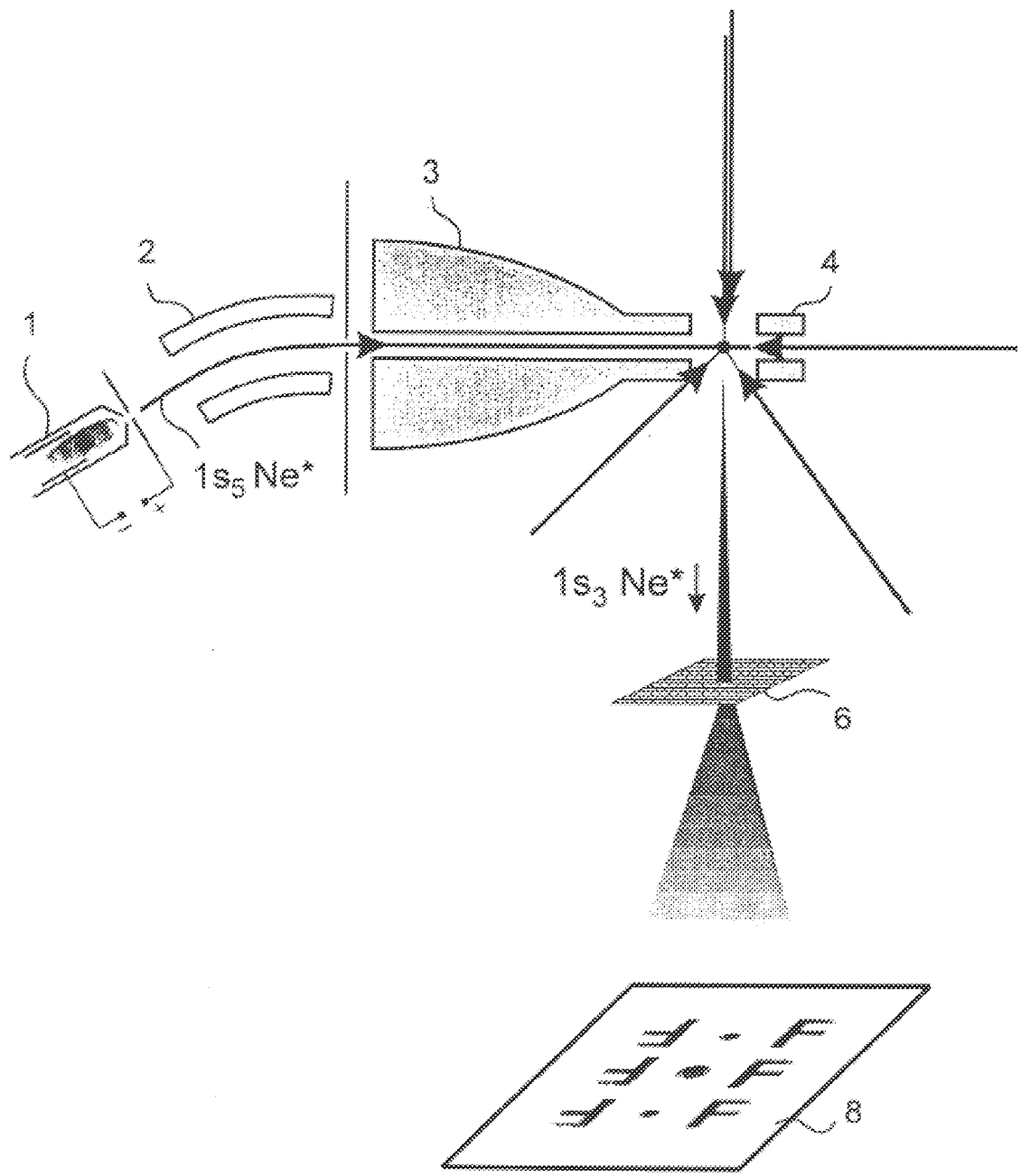
FIG. 1 is a diagram showing a structure of a material wave writing system of an embodiment according to the invention.

FIG. 1 shows a structure of a material wave writing system of a first embodiment according to the invention. Shown in FIG. 1 is a basic structure of the system relating to an atomic beam holography.

For an electron-beam (E-beam) to be used for reconstruction of the hologram, it is necessary to obtain the atomic beams all having the same wavelength. The atomic seam source used in the tests conducted is one which produces Ne atoms of an extremely low temperature by a laser trapping method. Such a system is outlined hereunder followed by the explanation of the reconstruction of the atomic beam holography.

FIG. 1 diagrammatically shows a laser cooling system. This system may schematically be divided into an emission section 1 which produces Ne atoms in an excited state by glow discharging; a deflector 2 which removes ions, etc. from the atomic sources; a first stage cooling region (Zeeman slower) 3; a second stage cooling region (Magnet-Optic trap) 4; and a test region.

The Ne atoms which are in the excited state and from which excess ions, electrons, etc. have been removed by the deflector 2, are lead to the first stage cooling region 3. In the first cooling region (i.e., Zeeman slower or decelerator) 3, the atoms collide with photons directed in a direction opposite to the flying direction of the atoms so that, due to the momentum transfer, the movement of the atoms are decelerated. At this time, since the direction of the spontaneous emission of photons is random, the changes in the amount of momentum resulting from the photon emission in the course of a large number of repetitions of absorption and emission are canceled out to zero. For example, in the case of Ne atoms, the absorption and emission are repeated up to as many times as 20000 by the time they are stopped. However, during the time from the initial velocity until the stoppage of the Ne atoms, the atoms are influenced by the Doppler effects. The deviation in the resonant frequency caused by the Doppler effects is significantly larger than the transition spectrum width used in the cooling. Thus, if the laser frequency remains fixed, this frequency immediately deviates from the resonance frequency. Thus, the first stage cooling region (Zeeman slower) 3 has its object to compensate for the resonant frequency deviation (Doppler shift) by the Zeeman effects and to decelerate the atomic beam by holding the resonant frequency constant without allowing the laser frequency to undergo changes.

The decelerator has an exit which is connected to a magneto-optic trap which finally traps atoms and at which the atoms are caused to be substantially in a stopped state. The trapped region forms an atomic cloud which has a diameter smaller than about 50 $\mu$m and which is almost a point source of light. The temperature of the trapped Ne atoms is on the order of 50 $\mu$K in an absolute temperature. The atoms that are released from the trapping fall naturally in the gravity field, and the velocity thereof at the hologram surface that is disposed at a location corresponding to a paint where the atoms fell about 40 cm becomes v=280 cm/sec. The wavelength $\lambda$ of the material waves (de Broglie waves) at the above mentioned velocity may be given by:

$$\lambda = h/mv$$

wherein h is Planck's constant, m is mass and v is velocity. Thus, the wavelength $\lambda$ is 7.1 nm.

Figure 2:
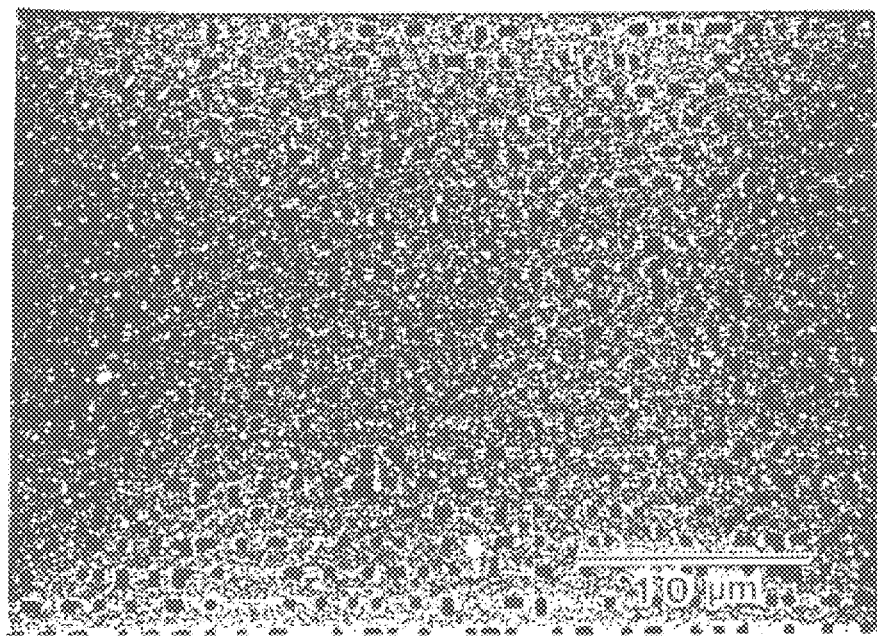
FIG. 2 is a diagram showing an example of a hologram formed on an SiN membrane.
Figure 3:
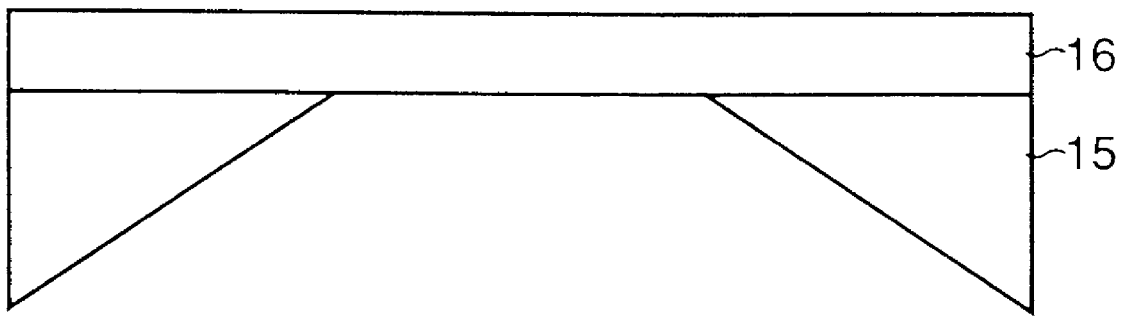
FIG. 3 is a sectional view showing an example of an SiN membrane hologram according to the invention.

FIG. 2 shows an example of the hologram of a through-hole type (an amplitude modulation type) wherein a Computer Generated Hologram (CGH) is written, transferred and etch-processed on an SiN membrane by using an electron beam writing system. FIG. 3 is a sectional view showing the SiN membrane hologram plate. The thickness of the SiN membrane used is 100 nm and the size of a window of the membrane is 1 mm×1 mm. A hologram pattern is formed on this membrane. In the example, the size of a hole (cell) of the hologram is 0.3 $\mu$m, and the hologram is constituted by 1024 columns and 1024 rows of cells with the size of the hologram being about 0.5 mm vertically and 0.5 mm horizontally.

Figure 4:
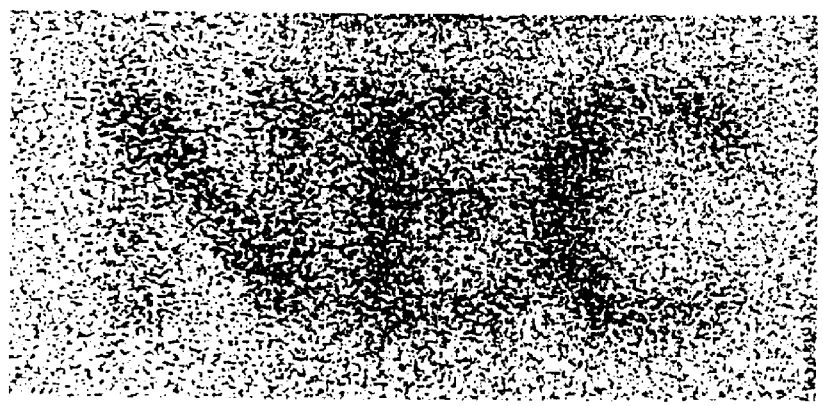
FIG. 4 is a diagram showing an example of an "NEC" pattern reconstructed on a wafer by Ne atomic beam.

At a location 45 cm below a surface of the hologram 6, there is an MCP (micro-channel plate) 8 which detects the atoms. The relation between the size of a hologram reconstruction image and its optical location at the position of the hologram is determined approximately by the wavelength of atomic waves, the distance to the MCP (micro-channel plate) and the size of cells (basic cycles). In the test, the atoms have been allowed to naturally fall about 40 cm from the trap location of the atoms as shown in FIG. 1. The atoms reach this location in 0.28 seconds irrespective of its quantity and has a velocity of 280 cm/sec. The material wavelength (de Broglie wavelength) used in the test is 7.1 nm. FIG. 4 shows the hologram patterns by the Ne atom beam actually reconstructed. The Ne atoms having reached the MCP count about 100 thousands and have reconstructed clear "NEC" patterns.

The foregoing has shown that the reconstruction image of hologram can be obtained by using Ne atomic waves. The pattern sizes shown here are large sizes which are on the order of about 1 mm. However, these sizes in the designing of the hologram could be made smaller in principle to those of the wavelengths. That is, where the holography which utilizes the material waves is applied to lithography, there are various merits such as a better resolution as compared with optics and a simpler pattern formation without requiring resists.

Further, as an atomic beam source, it is possible to use a variety of elements such as Na, Cr and P, and also it is possible to have dopants in an LSI formation step formed and stacked directly without requiring resists at a desired location with an nanometer order resolution.

Figure 5:
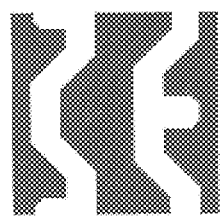
FIG. 5 is a diagram showing an example of a minimum unit pattern of a periodic fine pattern.
Figure 6:
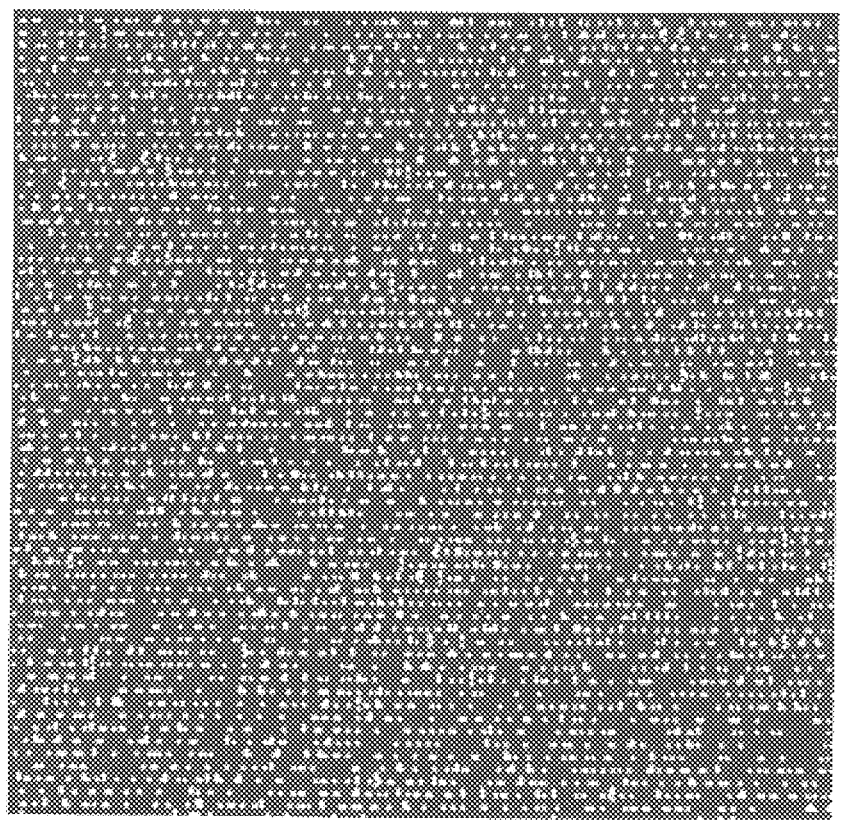
FIG. 6 is a diagram showing a hologram pattern, calculated by CGH, of the pattern of FIG. 5.
Figure 7:
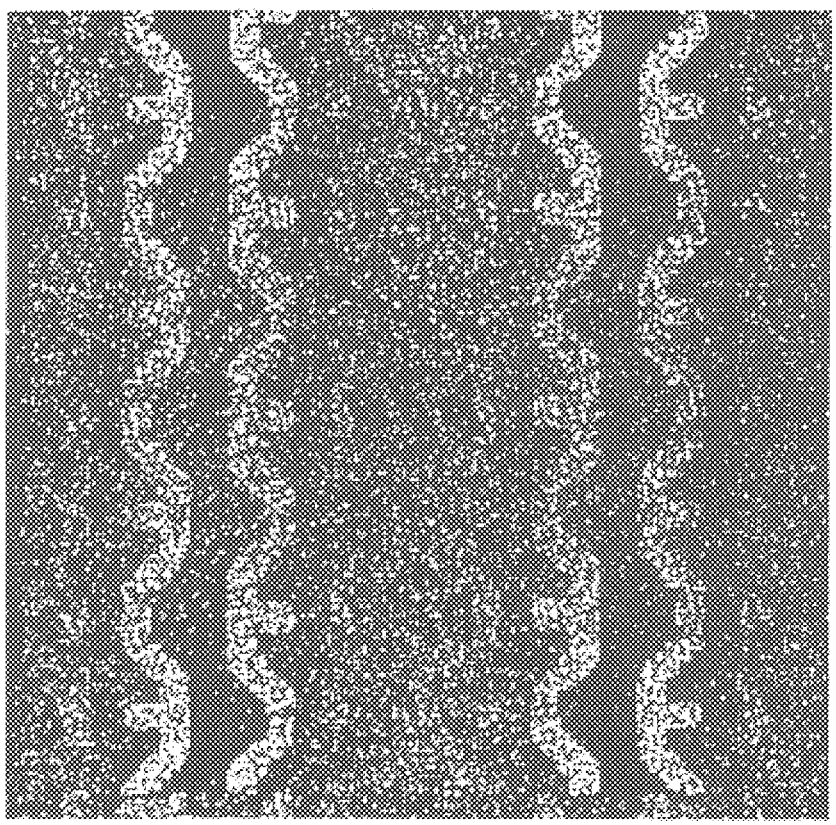
FIG. 7 is a diagram showing a fine periodic structural pattern produced by using the hologram pattern of FIG. 6.

Next, the formation of a periodic structure is explained. For example, the hologram (FIG. 6) of a periodic minimum unit pattern of a desired periodic structure pattern as shown in FIG. 5 is calculated, and the pattern is reconstructed using the hologram. Here, the reconstruction up to a higher order diffraction image enables the formation of a periodic structure pattern as shown in FIG. 7. These hologram reconstruction conditions are met if, in order to make the diffraction angle small, the wavelength of the incident waves is made sufficiently large with respect to a cell pitch of the hologram. The higher order diffraction image is reconstructed periodically with respect to a first order reconstruction image so that the periodic structure pattern formation can be carried out without a need of forming a periodic pattern on the hologram. This satisfies the need for high speed and simplified production of periodic structure patterns.

Figure 8:
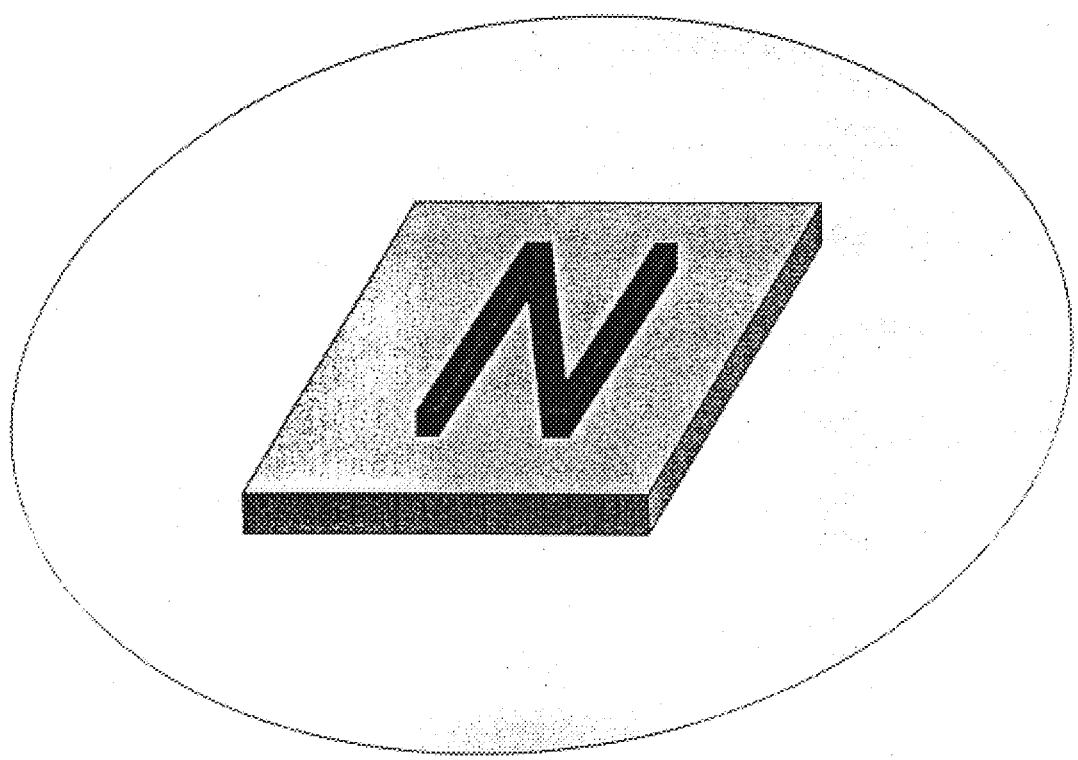
FIG. 8 is an image diagram showing a surface relief structure formed by a hologram.

Next, a method for producing a surface relief structure of an embodiment according to the invention is explained. As a reconstruction image from the hologram that is generated by a computer based on an imaginary surface relief structure, it is possible to form a three dimensional structure as shown in FIG. 8. Far example, by using neutral atoms such as Ca and P, and ions, it is possible to form a surface relief structure of an nanometer order directly on a substrate as desired. If, for example, an electron hologram is reconstructed on an Si substrate within a chamber in which a minute amount of a $W(CO)_6$ gas flows, this gas decomposes and a fine surface relief structure is formed on the Si substrate due to the deposition of W.

According to the above embodiment, since a fine surface relief structure can be formed without the scanning of the beams and further a hologram having any desired structure can be calculated by using CGH, the freedom and easiness of pattern formation are both effectively enhanced. Therefore, both the freedom and easiness in the manufacturing step are significantly improved.

The above explanation has been made on the pattern reconstruction technique using principally an atomic wave as a material wave. However, a source for reconstructing a hologram pattern is not limitative to the atomic wave. For example, since a wavelength of a coherent electron beam having an energy of several ten electron volts is in the order of angstrom, a hologram can be actually formed. Thus, it is possible to carry out an electron beam holograghy corresponding to the atomic beam holography.

Figure 9:
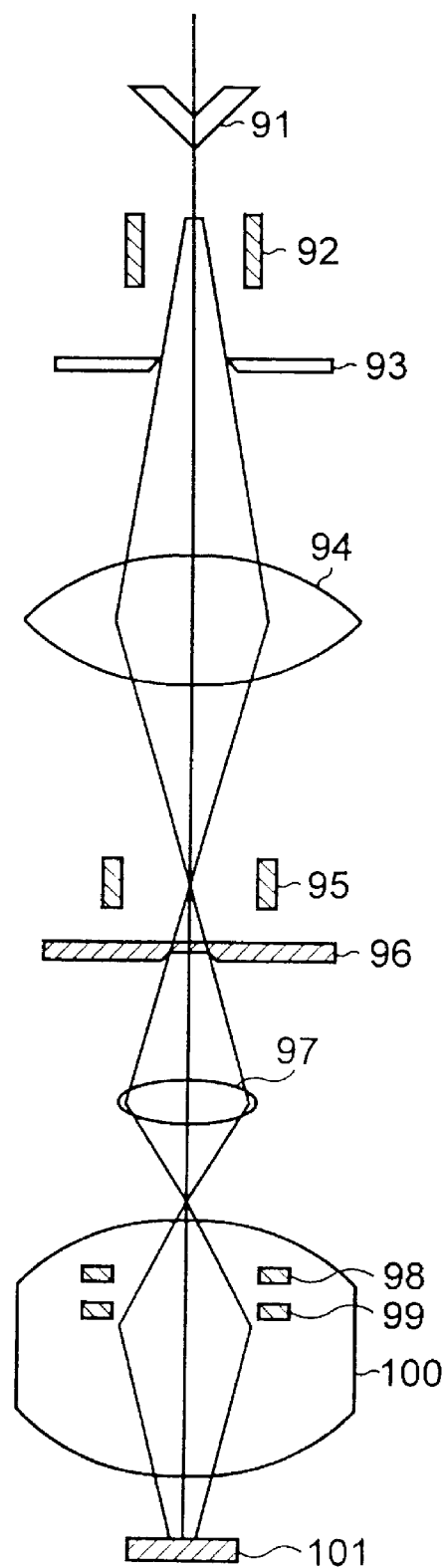
FIG. 9 is a diagram showing an electron beam hologram writing system of an embodiment according to the invention.

FIG. 9 shows a diagram of a structure of a hologram writing system using the electron beam according to the present invention. Electron beams emitted from an electron gun 91 are shaped into a predetermined shape by a shaping aperture 93 after passing through a blanking electrode 92 and, then, are incident on a condenser lens 94. After the electron beams which have passed through the condenser lens 94 are deflected by a deflector 95, they are irradiated on a hologram 96 so that there is produced interference of the electron beams.

After the reconstructed image thus obtained is reduced by a reduction lens 97, it is imaged on a wafer 101 through a projection lens 100 which is formed by a variable point astigmatic compensator 98 and a variable point focal compensator coil 99. As compared with the conventional writing system wherein a vector scanning by a point beam is used, an improvement in throughput is enhanced by the system according to the invention wherein the patterns are transferred at one time. Further, advantages in the reconstructed image on the hologram 96 are that it is not affected by the defects existing in the hologram 96 and, thus, the related maintenance is made extremely easy as compared with that for the masks used in the various prior art lithography processes.

In recent years, since field emitter type electron sources having excellent interference characteristics can be used, it is possible to clearly image, on the wafer, not only the first order reconstruction image but also the higher order reconstruction images. The combination of this characteristic and the reconstruction technique of the periodic patterns by the hologram as explained above makes it possible to achieve high resolution periodic patterns with high throughput. In the case where the ion beams are used, the same technique as that explained above can be utilized so far as the utilization of wave motion property is concerned.

As explained hereinabove, according to the present invention, since the fine patterns are formed by utilizing the interference of material waves, the minimum processing precision can be enhanced to the extent of the wavelength of the material wave.

Further, according to the present invention, the property of the hologram such that the reconstruction image is not affected by the impurities existing on the hologram or in the defects existing in the hologram itself makes the maintenance remarkably easy and significantly enhances the throughput both in the production of the hologram and in the formation of patterns as compared with the conventional pattern formation methods and writing systems.

Also, according to the invention, where a higher order reconstruction image reproduced periodically with respect to the first order reconstruction image is utilized as a reproduction image obtained by the hologram, it is only necessary to form a periodic minimum unit pattern without the formation of any periodic pattern on the hologram and this enables the formation of periodic structural pattern at a high speed and in a simple manner.

Also, by utilizing CGH, it is possible to calculate for the hologram an imaginary pattern which does not exist, which permits a patterning freedom and makes the necessary process extremely simple and which opens a way to a pattern repairing process during the device fabrication.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for forming a fine pattern on a substrate, comprising the steps of:

preparing a hologram having a pattern;

irradiating material waves on said hologram, said material waves being produced as atoms of an extremely low temperature; and imaging said pattern on said substrate with said material waves being interfered by passing through said hologram.

2. The method for forming a fine pattern on a substrate according to claim 1, in which, in the step of preparing the hologram, a periodic minimum unit pattern of desired periodic structure patterns is converted and recorded in said hologram and, in the step of imaging the material waves, a high order diffraction image obtained by irradiating said material waves on said hologram is included in the imaging on said substrate.

3. A material wave writing system for forming a fine pattern on a substrate, said system comprising:

a light source section for generating material waves, said material waves being produced as atoms of an extremely low temperature;

a hologram section having a hologram and receiving said material waves from said light source section, said hologram having a pattern to be transferred on said substrate; and an optical system for imaging said pattern at a predetermined position on said substrate with said material waves being interfered by passing through said hologram.

4. The material wave writing system according to claim 3, in which said light source section comprises a neutral atom source that emits a neutral atom having a coherent wave front.

5. A method for forming a fine surface relief structure, comprising the steps of:

preparing a binary hologram generated by a computer based on a hologram data of a surface relief structure;

irradiating material waves on said binary hologram, said material waves being produced as atoms of extremely low temperature; and forming a material wave reconstructed image at a substrate position with the image corresponding to irradiation intensities and focal points of said surface relief structure.

* * * * *